Patented May 7, 1946

2,399,959

UNITED STATES PATENT OFFICE 2,399,959

PROCESS OF PRODUCING ESTERS

Nathaniel Beverley Tucker, Louisville, Ky., assignor to The Procter & Gamble Company, Cincinnati, Ohio, a corporation of Ohio No Drawing. Application July 2, 1942,
Serial No. 449,497

18 Claims. (Cl. 260—410)

This invention relates broadly to the production of carboxylic acid esters.

It is an object of this invention to provide an improved process for the production of carboxylic acid esters.

In my copending applications, Ser. No. 387,985, filed April 10, 1941, now Patent 2,289,391, and Ser. No. 422,684, filed December 12, 1941, now Patent 2,342,562, I have shown that salts of fatty acids and halogen substituted alkyl metal sulfonates react at a higher rate and to a greater degree of completion when the condensation is conducted in the presence of certain amides or substituted amides derived from monocarboxylic acids. I have now found that with reactions which do not involve sulfonates at all, the use of amides of a certain class as reaction media have useful application whenever it is desired to produce an ester of a carboxylic acid by reaction of a carboxylate salt and a halogen acid ester of an aliphatic alcoholic hydroxy compound free of sulfonate groups, such as for example in cases (1) where the aliphatic halide is more generally available than the corresponding alcohol, as in the case of chlorinated lower molecular weight olefins, chlorinated paraffins and chlorinated kerosene fractions, and (2) where it is desired to form an ester of a hydroxy carboxylic acid, in which reaction, self esterification and resulting polymerization is likely to occur when the hydroxy carboxylic acid is subjected to esterification conditions with an alcohol for example.

Ordinarily reactions involving the condensation of metal carboxylates and halide esters herein referred to progress relatively slowly, in some instances even at temperatures in the neighborhood of 200° C., and consequently products of condensations conducted in accordance with the practice heretofore known in the art either have contained unreacted ingredients because of too short a time of reaction or too low a reaction temperature, or have contained undesirable by-products including decomposition products because of too long a reaction time or too high a reaction temperature. Consequently preparations of the prior art practices have usually resulted in low yields of ester and have required extensive purification to recover same from the reaction mix.

These disadvantages of prior art methods are in large measure overcome by my invention in accordance with which the ester is formed by the condensation of the carboxylate salt and the aliphatic halide in the presence of a substantial amount of an inert reaction medium consisting essentially of an amide compound in which both reactants are at least partially soluble and which has the general formula—$R \cdot CO \cdot NR'R''$—wherein R is alkyl, aryl, or hydroxy alkyl, and R' and R'' are radicals selected from the group consisting of hydrogen, alkyl, aryl, hydroxy alkyl, and alkylene, R' and R'' each being alkylene only when the other is alkylene and being joined together through an oxygen atom ($-R' \cdot O \cdot R''-$).

The highly advantageous action of the reaction medium in the condensation reaction above identified is not due solely to the solvent action which the amide or substituted amide has for the reactants, because I have found that ethylene glycol and other materials which are excellent solvents for both reactants do not function in the same manner as the amides and substituted amides herein covered, but in contrast thereto result in lower yields of esterification products which are contaminated so highly with unreacted salt and other detrimental impurities that purification by crystallization from a solvent is essential if substantially pure products are desired. Apparently the amide or substituted amide which I use in accordance with my invention possesses a characteristic or combination of characteristics such as catalytic effect in combination with solvent effect, making this type of compound especially suitable for the purpose at hand because, as far as I am aware, there are no other compounds which function in the same manner as the amides and substituted amides covered herein to give the highly advantageous result of the present invention.

In the preferred practice of my invention the carboxylate salt is heated with the aliphatic halide in the presence of a sufficient amount of amide or substituted amide as the reaction medium to allow the formation of a fluid reaction mix at elevated temperature. Under such conditions a substantial part of the reactants is in solution. After the reaction has reached substantial completion, as may be determined by the discontinuance of the precipitation of neutral salt or by the titration of a sample of the mass in water for halogen resulting from the ionization of the neutral salt formed in the reaction, the reaction medium may be removed by distillation from the mixture at atmospheric or subatmospheric pressure, but at a temperature below that at which the reactants or products decompose. If the amide employed cannot be readily removed from the reaction product by distillation, then purification by crystallization from a solvent or by extraction with a selective solvent may be effected if desired.

My invention and the manner in which it may be practiced will be clear from the following examples in which specific conditions of operation are set forth. However it is to be understood that these examples are merely exemplary and that the invention is not limited to the conditions or the reactants described, but rather to the scope of the appended claims.

*Example 1.*—22 parts sodium coconut oil soap, 18 parts decyl chloride, and 40 parts butyramide were agitated at 140° C. for about 16 hours. The reaction product was mixed with aqueous alcohol and extracted with petroleum ether. Evaporation of the petroleum ether extract yielded a product which, without further purification, had an acid value of 0.6 and a saponification value of 138.2.

*Example 2.*—13 parts benzyl chloride, 23 parts sodium coconut oil soap, and 50 parts acetamide were heated at 140° C. to 150° C. for 5 hours, at which time the reaction was complete as indicated by titration for ionic chlorine. The reaction mix was introduced into water and extracted with ether, the ether extract being subsequently water washed. On evaporation of the ether a product having an acid value of 9.0 and a saponification value of 203.7 was obtained.

*Example 3.*—70 parts of dried and ground dry sodium coconut oil soap and 150 parts acetamide were mixed and heated to 140° C. and agitated until uniform, after which 15 parts of 1,2,3-trichlorpropane were introduced into the reaction mix rapidly. After 1½ hours at 140° C. equilibrium was reached as indicated by titrations for ionic chlorine. The reaction product was mixed with water and extracted four times with ether. The ether extract was subsequently washed with water, filtered and evaporated. The product without further purification contained 6.2% chlorine by analysis.

*Example 4.*—23 parts of oven dried sodium coconut oil soap, 12 parts of n-amyl chloride, and 50 parts of acetamide were mixed and agitated at 170° to 180° C. for 8 hours, after which the reaction product was added to water and extracted with ether. The ether extract was water washed and evaporated to yield a product having an acid value of 12.7 and a saponification value of 203.4.

*Example 5.*—22 parts of sodium coconut oil soap, 20 parts of an alkyl chloride resulting from the chlorination of a kerosene fraction having an average of 12 carbon atoms per molecule, and 40 parts of the ethanolamide derived from the fatty acids obtained from coconut oil were heated at 180° C. for 7 hours, at the end of which time titration of the reaction mix for ionic chlorine indicated 95% completion of the reaction.

*Example 6.*—40 parts of the alkyl chloride used in Example 5, 44 parts of dried coconut oil soap, and 40 parts of capramide were heated at 180° C. for 24 hours. After the reaction had reached 92% completion as determined by titration for ionic chlorine, the bulk of the amide was removed by distillation at one millimeter pressure and the residue was introduced into water and extracted with petroleum ether. Upon evaporation of the petroleum ether solvent a brown oil having an acid value of 7.7 and a saponification value of 170.5 was obtained.

*Example 7.*—92 parts of dry sodium coconut oil soap, 50 parts of monochlorhydrin, and 200 parts of acetamide were heated and stirred together at 140° C. for 90 minutes. The reagents went into solution promptly but the mix soon clouded due to the precipitation of sodium chloride. The acetamide was distilled off in vacuum at a temperature of 150° C., the fat taken up in ether, filtered, washed with water and dried. The purified product had an acid value of 14.2, a saponification value of 217.9, and a hydroxyl value of 317. A sample of the product yielded about 29% glycerin on hydrolysis. These analyses show that the product of reaction consisted almost wholly of coconut oil monoglyceride.

The above examples are sufficient to illustrate the manner in which the invention may be practiced and it will not be necessary to show by way of specific examples the various modifications and combinations that can be made.

My process is especially useful for making the esters of higher fatty acids having eight to twenty-two carbons per molecule such as lauric, palmitic, oleic and those mixed acids obtainable from the naturally occurring vegetable and animal fats and oils, and of polyhydric alcohols or other alcohols having limited miscibility with the fatty acids. However, I may employ in my process halides corresponding to other alcohols and salts of other carboxylic acids. For instance, my process is particularly applicable to the preparation of esters of hydroxy acids, such as hydroxy acetic acid, which on direct esterification with an added alcohol undergo esterification at the hydroxyl group of the acid in addition to esterification between the acid and the added alcohol. This complication may be avoided when an ester of such an acid is made by my process.

Also, it should be noted that in addition to alkali metal carboxylate salts, alkaline earth metal salts such as calcium and magnesium salts, or even some heavy metal salts, may be used provided the metal is such that it readily combines with the halogen of the halogen acid ester to produce a neutral salt.

In the examples I have shown throughout the reaction of chlorides with the carboxylate salts merely because these derivatives are readily available or easily prepared. However, other aliphatic halides such as bromides and iodides may be employed with equal ease without departing from the spirit of the invention.

Furthermore, the term "aliphatic halide" as used in the specification and claims, unless otherwise designated, is intended to include halide derivatives of alkyl compounds generally such as lauryl iodide, methallyl bromide, etc., of aryl-substituted alkyl halides such as benzyl chloride, and of other aliphatic compounds free of sulfonate groups both saturated and unsaturated. In this connection I desire to point out that there are unsaturated compounds coming within the broad terminology above defined, such as vinyl halides (—C:CX) which are very inactive and do not react efficiently with carboxylate salts. Even in these cases the presence of the amide is of some benefit, but the important applications of the process of my invention reside in the condensation of the more active halides with the carboxylate salts.

It has been stated above that the amides or substituted amides which may be employed in my invention are those which do not take part in the reaction herein involved but which at least partially dissolve the reacting compounds. Specific examples of amides and substituted amides which may be employed in accordance with the invention are as follows:

$$\underset{\text{Acetamide}}{CH_3 \cdot \overset{O}{\underset{\|}{C}} \cdot NH_2}$$

Benzamide (C₆H₅–CO–NH₂)

Acetanilide (CH₃·CO·NH·C₆H₅)

$$\underset{\text{Propionamide}}{C_2H_5 \cdot \overset{O}{\underset{\|}{C}} \cdot NH_2}$$

$$\underset{\text{Butyramide}}{C_3H_7 \cdot \overset{O}{\underset{\|}{C}} \cdot NH_2}$$

$$\underset{\text{Isobutyramide}}{CH_3 \cdot CH \cdot \overset{O}{\underset{\|}{C}} \cdot NH_2}$$ with CH₃ branch Diethylacetamide CH₃·CO·N(C₂H₅)₂

Ethanolacetamide CH₃·CO·NH·C₂H₄OH

Hydroxy acetamide CH₂(OH)·CO·NH₂

Diethyl caprylamide C₇H₁₅·CO·N(C₂H₅)₂

Dibutyl lauramide C₁₁H₂₃·CO·N(C₄H₉)₂

Ethanol lauramide C₁₁H₂₃·CO·NH·C₂H₄OH

Acetyl morpholine CH₃·CO·N(C₂H₄)₂O

N-Lauroyl morpholine C₁₁H₂₃CO·N(C₂H₄)₂O

C₉H₁₉·CO·NH₂
Amide of capric acid

C₁₁H₂₃·CO·NH₂
Amide of lauric acid

C₁₃H₂₇·CO·NH·C₂H₄OH
Monoethanolamide of myristic acid

C₉H₁₉·CO·NH·CH₂·CHOH·CH₂OH
Monoglycerylamide of capric acid

C₁₁H₂₃·CO·NH·CH₃
Methyl lauramide

C₁₁H₂₃·CO·NH·C₂H₅
Ethyl lauramide

C₉H₁₉·CO·NH·C₃H₇
Monopropyl amide of capric acid

C₉H₁₉·CO·NH·C₄H₉
Monobutyl amide of capric acid

C₁₃H₂₇CO·N(CH₃)₂
Dimethyl amide of myristic acid

C₁₁H₂₃·CO·N·(C₂H₅)
Diethyl amide of lauric acid $$C_{11}H_{23} \cdot CO \cdot N \begin{smallmatrix} C_2H_5 \\ CH_3 \end{smallmatrix}$$
Methyl ethyl amide of lauric acid $$C_9H_{19} \cdot CO \cdot N \begin{smallmatrix} CH_3 \\ C_3H_7 \end{smallmatrix}$$
Methyl propyl amide of capric acid In general, amides which at least partially dissolve both reactants will effect some improvement in the reaction but all amides are not equally efficient in all reactions. For example, I have found that in the reaction between coconut oil soap and the kerosene chloride of Example 5 a higher molecular weight amide compound, such as the amide of the mixture of coconut oil fatty acids consisting predominantly of fatty acids having ten to fourteen carbon atoms, dissolves the reactants to a greater degree than the amide compounds of lower molecular weight and thus are better suited to that particular condensation. Thus there may be a preference for one amide compound over another in some instances.

In the practice of my invention I prefer to employ the lowest possible temperature at which the reaction will proceed readily and at which no serious decomposition of reactants or products takes place. In some instances the reaction may be conducted at temperatures as low as 130° C.; in other instances higher temperatures are required, such as 150° C., and in the case of the reactions involving the use of higher molecular weight chlorides temperatures in the neighborhood of 180° C. may be necessary. In all cases the presence of the amide effects an improvement in the reaction rate and an improved yield of desired product.

The amount of amide or substituted amide which should be employed is not critical. I have found that in some instances an amount less than half the weight of the mixture of carboxylate salt and halogen substituted compound will be sufficient; in other cases, especially those where the solubility of the reactants in the amide is low, I have found that the use of a larger amount of reaction medium, such as an amount equal to the combined weights of the reactants or an amount which is much larger, even four to six times the combined weight, may be necessary. An excess of amide is not harmful.

Having thus described my invention, what I claim and desire to secure by Letters Patent is:

1. The process claimed in claim 15, in which the amide is one in which R' and R" are both hydrogen.

2. The process claimed in claim 15, in which the amide is acetamide.

3. The process claimed in claim 15, in which the metal salt is a soap of a saponifiable natural fat and the halogen acid ester is the hydrogen chloride ester of a saturated aliphatic alcoholic hydroxy substance.

4. The process claimed in claim 15, in which the metal salt is sodium coconut oil soap, the halide ester is monochlorhydrin, and the amide is acetamide.

5. The process claimed in claim 15, in which the amide is a N-di-substituted amide.

6. The process claimed in claim 15, in which the amide is a N-di-substituted amide derived from a mixture of fatty acids contained in coconut oil and consisting predominantly of fatty acids having ten to fourteen carbon atoms per molecule.

7. The process claimed in claim 15, in which the amide is derived from morpholine and a mixture of fatty acids contained in coconut oil and having ten to fourteen carbon atoms per molecule.

8. The process claimed in claim 15, in which the amide comprises essentially the amide of morpholine and lauric acid.

9. The process claimed in claim 15 in which the metal salt is sodium coconut oil soap and the halide ester is a chloride derived from a kerosene fraction.

10. The process claimed in claim 15, in which the metal salt is sodium coconut oil soap, the halide ester is the chloride derived from a kerosene fraction consisting predominantly of hydrocarbons having twelve carbon atoms per molecule, and the amide comprises essentially the amide of morpholine and lauric acid.

11. The process claimed in claim 15, in which the amide is the amide of a mixture of fatty acids of coconut oil consisting predominantly of fatty acids having ten to fourteen carbon atoms.

12. The process claimed in claim 15, in which the amide comprises essentially lauramide.

13. The process claimed in claim 15, in which the metal salt is sodium coconut soap and the halide ester is n-amyl chloride.

14. The process claimed in claim 15, in which the metal salt is sodium coconut soap, the halide ester is n-amyl chloride, and the amide comprises essentially lauramide.

15. In the process of condensing a metal salt of a fatty acid having 8 to 22 carbon atoms and an aliphatic halide free of sulfonate groups wherein an ester and a neutral salt are formed, the improvement which comprises conducting the condensation in the presence of an amide which does not enter into the reaction but which at least partially dissolves the reactants and which has the formula R—CO—NR'R" wherein R is a radical of the group consisting of alkyl, aryl, and hydroxy alkyl, and R' and R" are selected from the group consisting of hydrogen, alkyl, aryl, hydroxy alkyl, and alkylene, R' and R" each being alkylene only when the other is alkylene and then being joined together through an oxygen atom.

16. In the process of condensing a metal salt of a fatty acid having 8 to 22 carbon atoms and an aliphatic halide free of sulfonate groups and selected from the group consisting of aliphatic chlorides, bromides, and iodides, in which condensation an ester and a neutral salt are formed, the improvement which comprises conducting the condensation in the presence of an amide which does not enter into the reaction but which at least partially dissolves the reactants and which has the formula R—CO—NR'R" wherein R is a radical of the group consisting of alkyl, aryl, and hydroxy alkyl, and R' and R" are selected from the group consisting of hydrogen, alkyl, aryl, hydroxy alkyl, and alkylene, R' and R" each being alkylene only when the other is alkylene and then being joined together through an oxygen atom, and thereafter separating the ester from the condensation mix.

17. In the process of condensing a metal salt of a fatty acid having 8 to 22 carbon atoms and an aliphatic halide free of sulfonate groups and selected from the group consisting of aliphatic chlorides, bromides, and iodides, in which condensation an ester and a neutral salt are formed, the improvement which comprises conducting the condensation in the presence of an amide which does not enter into the reaction but which at least partially dissolves the reactants and which has the formula R—CO—NR'R" wherein R is a radical of the group consisting of alkyl, aryl, and hydroxy alkyl, and R' and R" are selected from the group consisting of hydrogen, alkyl, aryl, hydroxy alkyl, and alkylene, R' and R" each being alkylene only when the other is alkylene and then being joined together through an oxygen atom, and thereafter distilling off the amide under conditions of temperature and pressure which will not result in substantial decomposition of the said condensation product.

18. In the process of condensing a metal salt of a fatty acid having 8 to 22 carbon atoms and an aliphatic halide free of sulfonate groups and selected from the group consisting of aliphatic chlorides, bromides, and iodides, in which condensation an ester and a neutral salt are formed, the improvement which comprises conducting the condensation in the presence of an amide which does not enter into the reaction but which at least partially dissolves the reactants and which has the formula R—CO—NR'R" wherein R is a radical of the group consisting of alkyl, aryl, and hydroxy alkyl, and R' and R" are selected from the group consisting of hydrogen, alkyl, aryl, hydroxy alkyl, and alkylene, R' and R" each being alkylene only when the other is alkylene and then being joined together through an oxygen atom, and thereafter separating the amide from the condensation product with the aid of a solvent.

NATHANIEL BEVERLEY TUCKER.